(12) United States Patent
Rapaport et al.

(10) Patent No.: US 7,618,734 B2
(45) Date of Patent: Nov. 17, 2009

(54) BRANCHED FLUID CHANNELS FOR IMPROVED FLUID FLOW THROUGH FUEL CELL

(75) Inventors: Pinkhas A Rapaport, Fairport, NY (US); Jeffrey A Rock, Fairport, NY (US)

(73) Assignee: General Motors Corporation, Detroit, MI (US)

( * ) Notice: Subject to any disclaimer, the term of this patent is extended or adjusted under 35 U.S.C. 154(b) by 572 days.

(21) Appl. No.: 10/848,701

(22) Filed: May 19, 2004

(65) Prior Publication Data
US 2005/0260472 A1 Nov. 24, 2005

(51) Int. Cl.
*H01M 2/02* (2006.01)
*H01M 2/14* (2006.01)
(52) U.S. Cl. .............................. 429/34; 429/38; 429/39
(58) Field of Classification Search ................... 429/39, 429/38, 34, 26; 165/164
See application file for complete search history.

(56) References Cited

U.S. PATENT DOCUMENTS

| | | | |
|---|---|---|---|
| 6,309,773 B1 | 10/2001 | Rock | 429/34 |
| 6,406,809 B1* | 6/2002 | Fujii et al. | 429/34 |
| 2003/0175577 A1 | 9/2003 | Rock | 420/39 |
| 2004/0151971 A1* | 8/2004 | Rock | 429/38 |
| 2004/0151973 A1* | 8/2004 | Rock | 429/38 |
| 2004/0209150 A1* | 10/2004 | Rock et al. | 429/38 |

OTHER PUBLICATIONS

International Search Report dated Jun. 22, 2006 for Appln. No. PCT/US05/13970 filed Apr. 25, 2005 corresponding to this application.

* cited by examiner

*Primary Examiner*—Raymond Alejandro
(74) *Attorney, Agent, or Firm*—Harness, Dickey & Pierce, P.L.C.

(57) ABSTRACT

A flow field geometry formed in a separator plate of a fuel cell includes a plurality of straight inlet legs including a first lateral inlet leg laterally offset from a first inlet leg and a dividing junction associated with each of the plurality of straight inlet legs. The dividing junction divides a straight inlet leg into a plurality of branched legs. A number of a first set of branched legs associated with the first lateral inlet leg is greater than a number of a set of branched legs associated with the first inlet leg.

20 Claims, 6 Drawing Sheets

BRANCHED FLUID CHANNELS FOR IMPROVED FLUID FLOW THROUGH FUEL CELL

FIELD OF THE INVENTION

The present invention relates to fuel cells, and more particularly to regulating fluid flow through a flow field of a fuel cell.

BACKGROUND OF THE INVENTION

Fuel cells produce electricity through electrochemical reaction and have been used as power sources in many applications. Fuel cells can offer significant benefits over other sources of electrical energy, such as improved efficiency, reliability, durability, cost and environmental benefits. Fuel cells may eventually be used in automobiles and trucks. Fuel cells may also power homes and businesses.

There are several different types of fuel cells, each having advantages that may make them particularly suited to given applications. One type is a proton exchange membrane (PEM) fuel cell, which has a membrane sandwiched between an anode and a cathode. To produce electricity through an electrochemical reaction, hydrogen ($H_2$) is supplied to the anode and air or oxygen ($O_2$) is supplied to the cathode.

In a first half-cell reaction, hydrogen ($H_2$) is split into hydrogen protons ($H^+$) and electrons ($e^-$). Because the membrane is proton conductive only, the protons are transported through the membrane. The electrons flow through the bipolar plate that separates two adjacent into the cathode half of an adjacent cell. In a second half-cell reaction, oxygen ($O_2$) at the cathode reacts with hydrogen protons ($H^+$) and electrons ($e^-$) from the anode half of the adjacent cell to form water ($H_2O$). The first and last cell of the stack are looped via an external load. Parasitic heat is generated by the reactions and must be regulated to provide efficient operation of the fuel cell stack.

The fuel cell stack includes coolant flow fields through which a coolant flows. The coolant is a heat transfer fluid that can warm or cool the fuel cell stack depending on the relative temperatures of the coolant and the fuel cell stack components. Traditional coolant flow fields distribute the coolant at varying rates across the fuel cell stack. As a result, there is a non-uniform temperature distribution across the fuel cell stack. Such non-uniform temperature distributions result in inefficient operation of the fuel cell stack and non-uniform stress loads in the fuel cell stack that can degrade the useful life of the fuel cell stack.

SUMMARY OF THE INVENTION

Accordingly, the present invention provides a flow field geometry formed in a separator plate of a fuel cell. The flow field geometry includes a plurality of straight inlet legs including a first lateral inlet leg laterally offset from a first inlet leg and a dividing junction associated with each of the plurality of straight inlet legs. The dividing junction divides a straight inlet leg into a plurality branched legs. A number of a first set of branched legs associated with the first lateral inlet leg is greater than a number of a set of branched legs associated with the first inlet leg.

In one feature, the flow field geometry further includes a second lateral inlet leg in the plurality of straight inlet legs. The second lateral inlet leg is laterally offset from the first inlet leg on a side opposite the first lateral inlet leg. A dividing junction is associated with the second lateral inlet leg. A number of a first set of branched legs associated with the second lateral inlet leg is greater than the number of the set of branched legs associated with the first inlet leg.

In another feature, a length is associated with each of the plurality of straight inlet legs to define a triangular-shaped length profile.

In another feature, the flow field geometry further includes a plurality of straight outlet legs including a first lateral outlet leg laterally offset from a first outlet leg. A uniting junction is associated with each of the plurality of straight outlet legs. The uniting junction joins a straight outlet leg from a plurality of branched legs.

In another feature, a number of a first set of branched legs associated with the first lateral outlet leg is greater than a number of a set of branched legs associated with the medial outlet leg.

In still another feature, the flow field geometry further includes a second lateral outlet leg in the plurality of straight outlet legs. The second lateral outlet leg is laterally offset from the first outlet leg on a side opposite the first lateral outlet leg. A uniting junction is associated with the second lateral outlet leg. A number of a second set of branched legs associated with the second lateral outlet leg is greater than the number of the set of branched legs associated with the first outlet leg.

In yet another feature, a length is associated with each of the plurality of straight outlet legs to define a triangular-shaped length profile.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
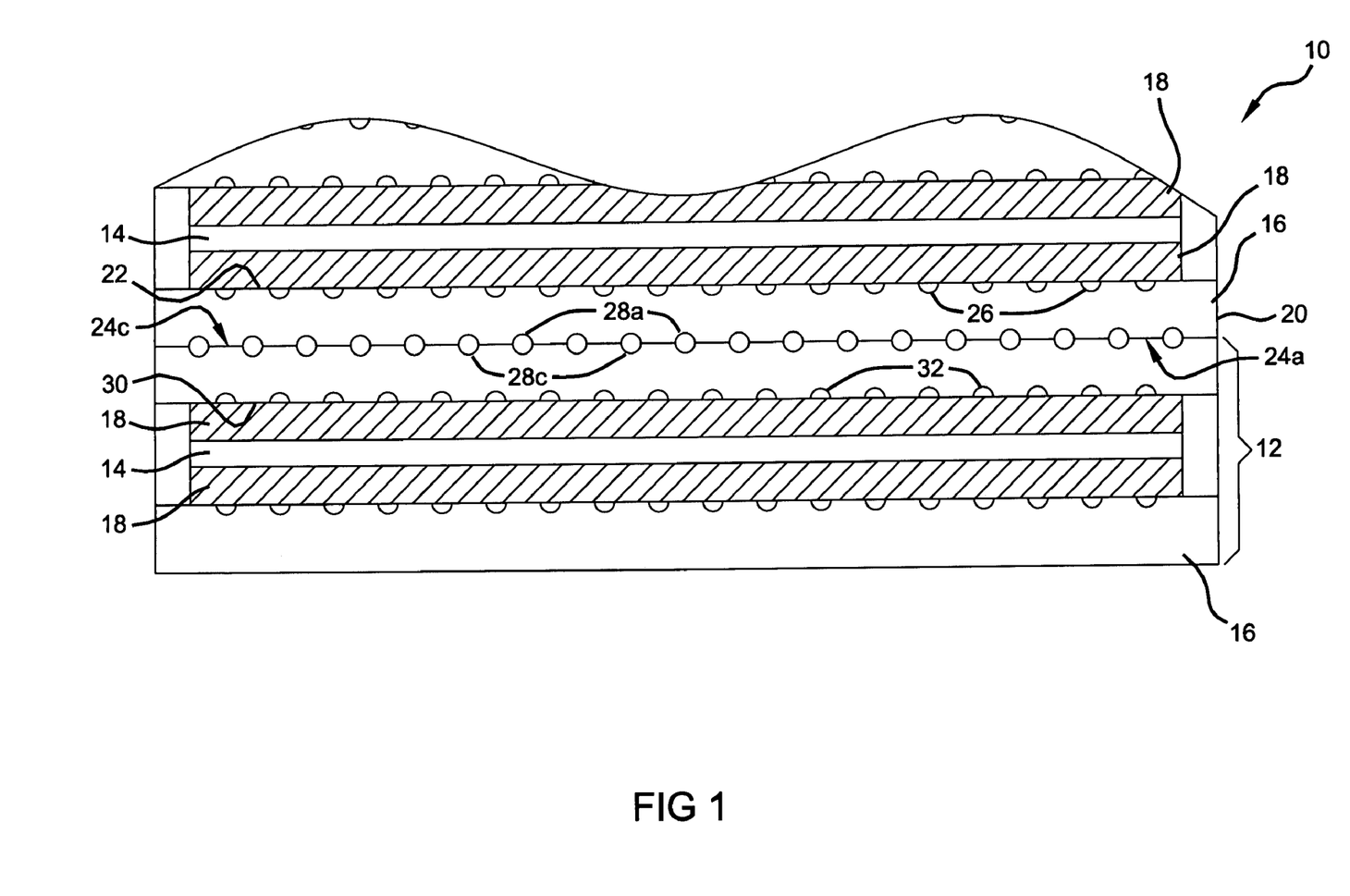
FIG. 1 is a cross-sectional view of a portion of a fuel cell stack.

Referring now to FIG. 1, a cross-section of a portion of a fuel cell stack 10 is illustrated. The fuel cell stack 10 includes a series of fuel cells 12. Each fuel cell 12 includes a membrane electrode assembly (MEA) 14 sandwiched between separator plates 16. Diffusion media 18 are disposed between the MEA 14 and each of the separator plates 16. An anode reactant (i.e., hydrogen) and a cathode reactant (i.e., oxygen) are distributed by the separator plates 16 for reaction across the MEA 14.

In one instance, the separator plates 16 are combined as a bipolar plate 20. Each bipolar plate 20 includes an anode separator plate 16 and a cathode separator plate 16. The anode separator plate 16 has an anode face 22 and a coolant face 24a. An anode flow field 26 is formed in the anode face 22 and a partial coolant flow field 28a is formed in the coolant face 24a. The cathode separator plate 16 includes a cathode face 30 and a coolant face 24c. A cathode flow field 32 is formed in the cathode face 30 and a partial coolant flow field 28c is formed in the coolant face 24c. The anode separator plate 16 and cathode separator plate 16 are stacked together so the coolant faces 24a, 24c lie adjacent to one another. The partial coolant flow fields 28a, 28c of the coolant faces 24a, 24c align to form fluid channels having a flow field geometry according to the present invention.

Figure 2:
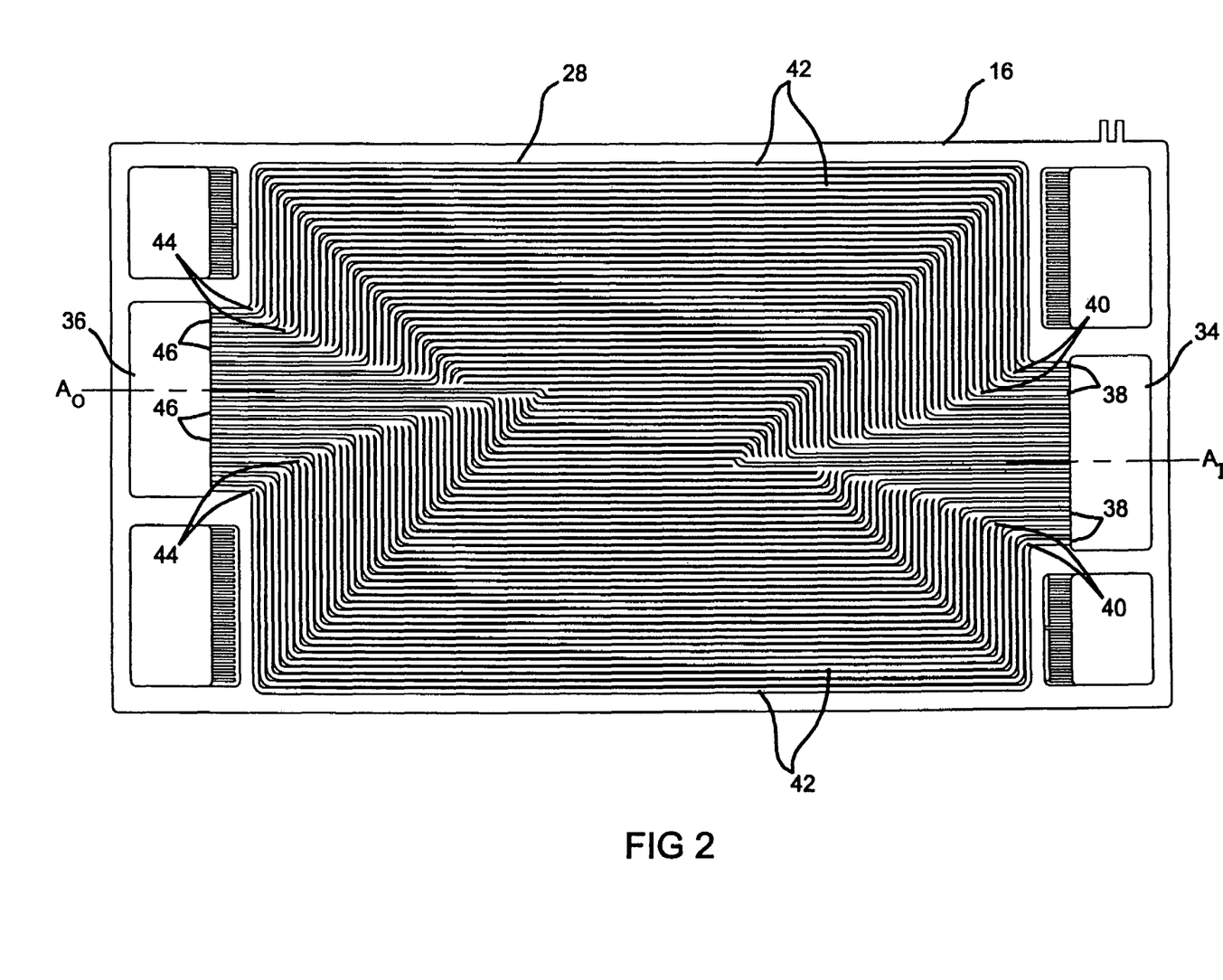
FIG. 2 is a plan view of a coolant flow field according to the present invention.
Figure 3:
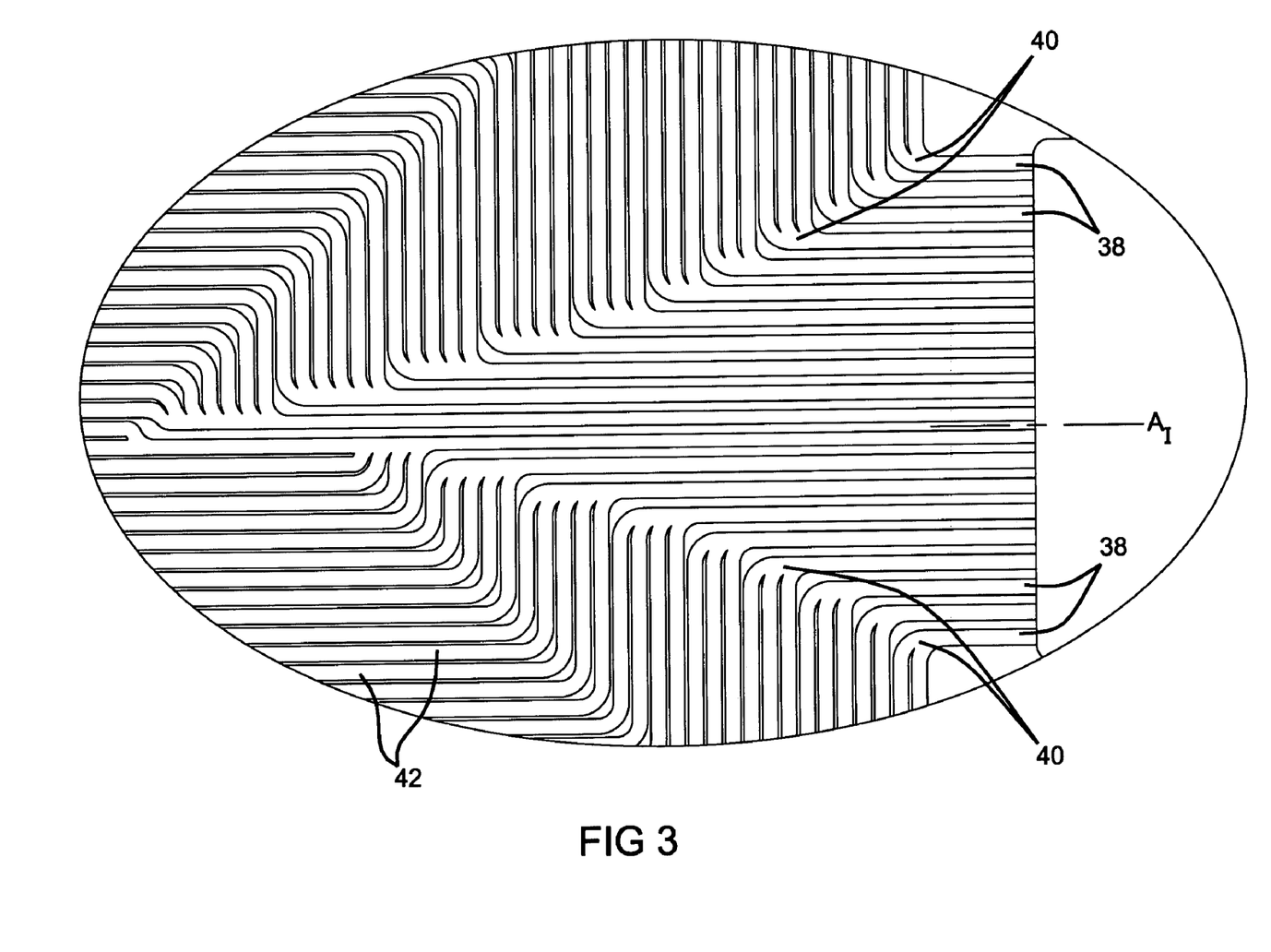
FIG. 3 is a more detailed view of an inlet portion of the coolant flow field of FIG. 2.
Figure 4:
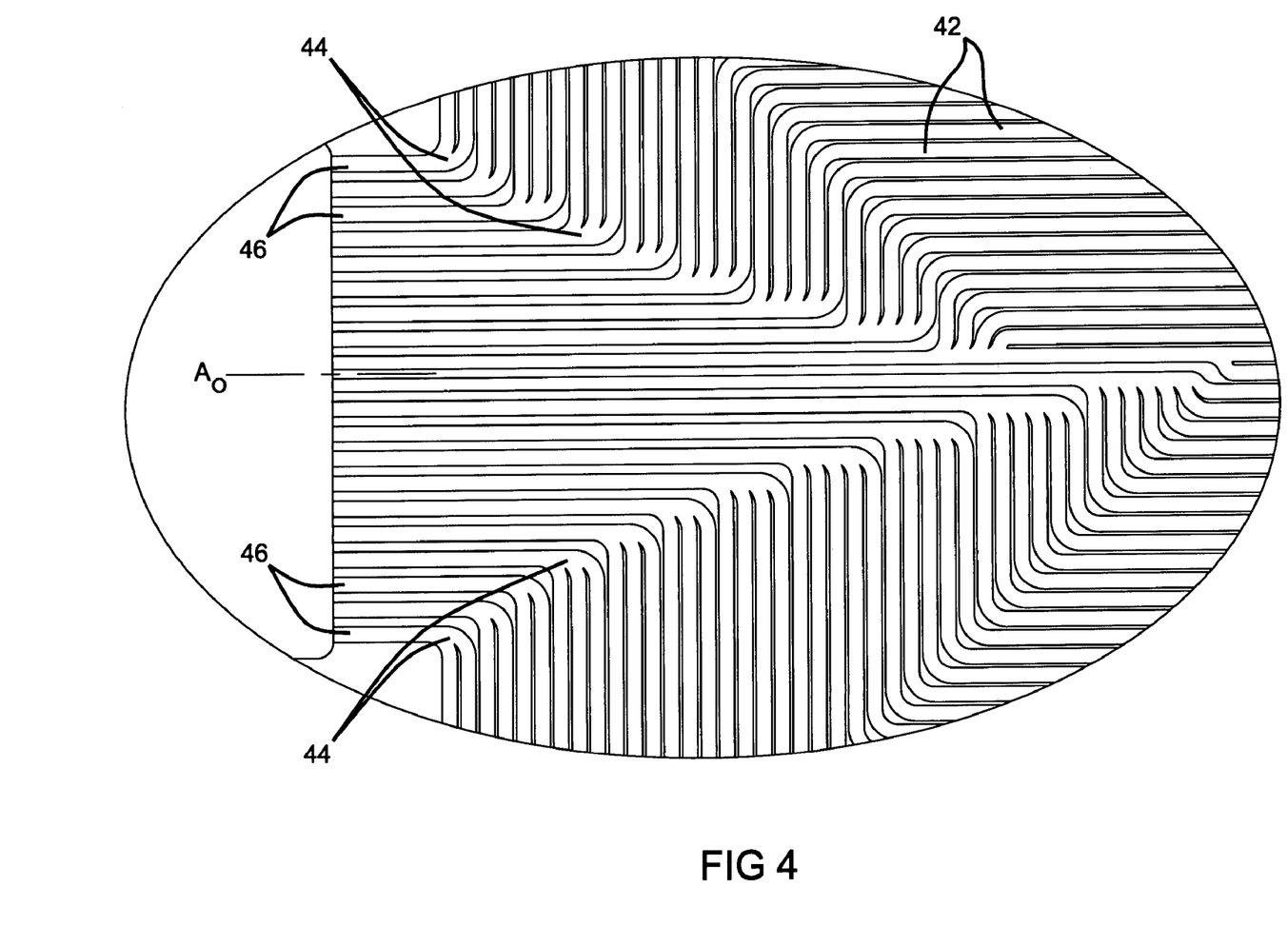
FIG. 4 is a more detailed view of an outlet portion of the coolant flow field of FIG. 2.

Referring now to FIGS. 2 through 4, the flow field geometry of the present invention will be described in detail. The plate of FIGS. 2 through 4 is illustrative of the coolant channels 28 of the bipolar plate 20. The bipolar plate 20 includes a coolant inlet header 34 and a coolant outlet header 36. Coolant flows into the coolant channels 28 through the inlet header 34 and is exhausted from the bipolar plate 20 through the outlet header 36. An inlet medial axis $(A_I)$ is defined along the center of the inlet header 34. As explained in further detail below, inlet legs 38 that are generally adjacent with the inlet medial axis are termed medial and those that are laterally offset from the inlet medial axis are termed lateral. Similarly, an outlet medial axis $(A_O)$ is defined along the center of the outlet header 36. Outlet legs 46 that are generally adjacent with the outlet medial axis are termed medial and those that are laterally offset from the outlet medial axis are termed lateral.

Each fluid channel includes an inlet leg 38, which can be straight, a dividing junction 40, branched legs 42, a uniting junction 44 and an outlet leg 46, which can be straight. More particularly, fluid from the inlet header 34 flows into a fluid channel through the inlet leg 38. The fluid volume is divided into the branched legs 42 at the dividing junction 40 (i.e., where a single inlet leg is divided into multiple branched legs). The divided fluid volume flows through the branched legs 42 and is recombined at the uniting junction 44 (i.e., where the multiple branched legs collapse into a single outlet leg). The fluid volume flows through the outlet leg 46 and is exhausted through the outlet header 36.

With particular reference to FIG. 3, the inlet legs 38 of the coolant flow field 28 define a generally triangular-shaped length profile. More particularly, the length of the inlet legs 38 decreases from the medially located inlet legs 38 (i.e., those aligned with or immediately adjacent to the medial axis) across the laterally located inlet legs 38 (i.e., those not immediately adjacent to or offset from the medial axis). In this manner, the inlet legs 38 that are closest to the medial axis are longer than those that are offset from the medial axis.

The length of a given fluid path directly effects a pressure drop of a fluid traveling through the fluid path. More particularly, a fluid pressure decreases as the fluid travels through the fluid path. Therefore, a greater pressure drop (i.e., pressure differential from inlet to outlet) is realized for a longer fluid path than a shorter fluid path. There is a direct relationship between the pressure differential and the fluid flow rate. More particularly, as pressure differential increases the fluid flow rate decreases. Because the inlet legs 38 that are closest to the medial axis are longer than those that are offset from the medial axis, a greater pressure differential is achieved across the more medial inlet legs 38. As a result, the fluid flow rate through the more medial inlet legs 38 is less than the fluid flow rate at the end of the more lateral inlet legs 38. In this manner, the inlet legs 38 define a corresponding triangular-shaped flow field profile, which functions to provide a high flow rate through the lateral flow channels relative to the medial flow channels.

The dividing junctions 40 are located at the ends of the inlet legs 38. The dividing junctions 40 divide each inlet leg 38 into multiple branched legs 42. Each dividing junction 40 can divide the inlet legs 38 into differing numbers of branched legs 42. More particularly, the dividing junctions 40 corresponding to the more medial inlet legs 38 divide the inlet legs 38 into more branched legs 42 than the dividing junctions 40 corresponding to the more lateral inlet legs 38. In general, the number of multiple branched legs 42 decreases from the medially located dividing junctions 40 across the laterally located dividing junctions 40.

For the exemplary flow channels illustrated in the Figures, twenty (20) inlet legs 38 are divided into seventy-five (75) branched legs 42. The most lateral dividing junctions 40 divide the inlet legs 38 into two branched legs 42. The medial dividing junctions 40 divide the inlet legs 38 into six and seven branched legs 42, respectively. The dividing junctions 40 located between the most medial dividing junctions 40 and the most lateral dividing junctions 40 divide the inlet legs 38 into varying numbers of branched legs 42 including six, five, four and three branched legs 42. The specific division of inlets into branched legs 42 is based on the specific flow field application. However, the number of branched legs 42 generally decreases from the medial dividing junctions 40 to the most lateral dividing junctions 40. It is appreciated that the fluid channels illustrated in the Figures are merely exemplary in nature.

Figure 5:
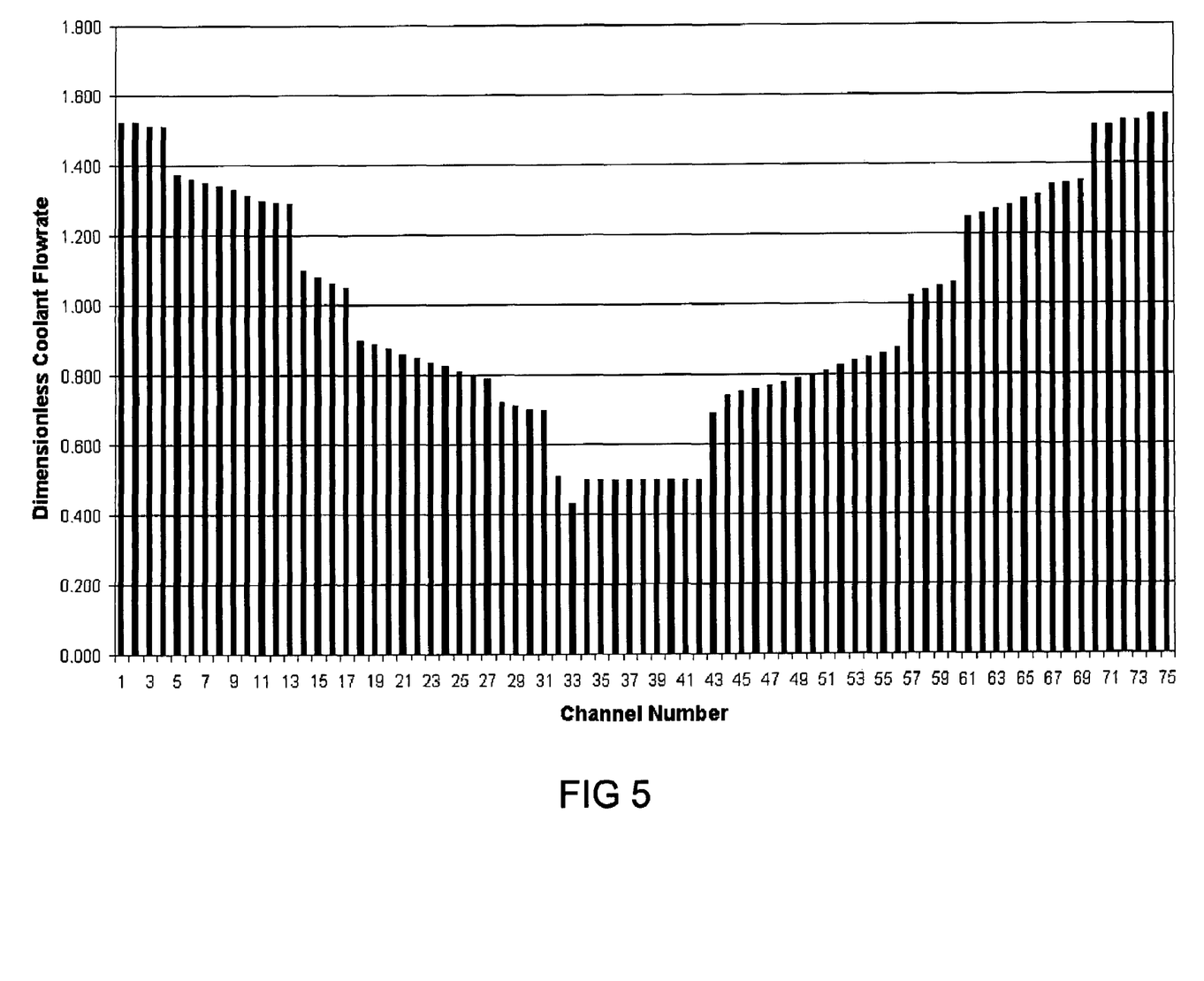
FIG. 5 is a graph illustrating an exemplary nominal flow rate profile across the coolant flow field.

The dividing junctions 40 divide the coolant and direct the coolant into the corresponding branched legs 42. As discussed in detail above, the fluid flow rate at the end of the most lateral inlet legs 38 is greater than the fluid flow rate at the end of the medial inlet legs 38. Because the dividing junctions 40 corresponding to the more medial inlet legs 38 divide the inlet legs 38 into more branched legs 42 than the dividing junctions 40 corresponding to the more lateral inlet legs 38, a fluid having a higher fluid flow rate is divided into less branched legs 42 at the more lateral dividing junctions 40 than a fluid having a lower fluid flow rate at the medial dividing junctions 40. As a result, the fluid flow rate in the branched legs 42 of the medial dividing junctions 40 is lower than the fluid flow rate in the branched legs 42 of the lateral dividing junctions 40. Referring now to FIG. 5, the flow rate through each channel, numbered sequentially from left to right, is graphically illustrated. The fluid flow rate increases from the medial branched legs 42 across the lateral branched legs 42 to provide a generally U-shaped flow rate profile across the branched legs.

Figure 6:
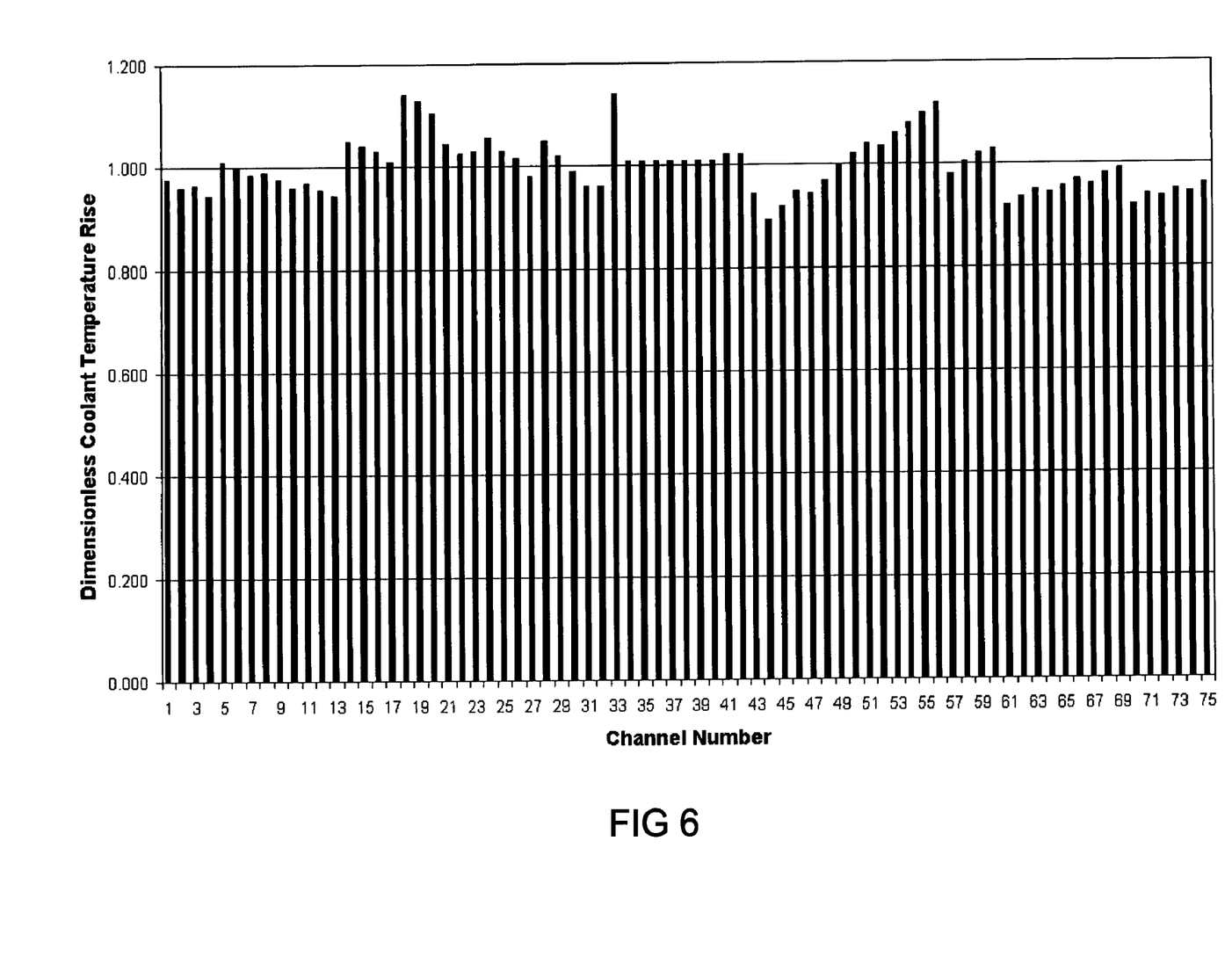
FIG. 6 is a graph illustrating an exemplary fluid temperature increase profile across the coolant flow field.

Referring now to FIGS. 2, 5 and 6, the lengths of the more lateral branched legs 42 are longer than the lengths of the more medial branched legs 42. The fluid flow rates of the more lateral branched legs 42 are greater than the fluid flow rates of the more medial branched legs 42. By dividing the fluid flow rate of a given branched leg 42 by the length of the branched leg 42, a flow rate per unit length is provided. The flow channel geometry of the present invention provides a roughly equivalent flow rate per unit length for the branched legs 42. In other words, the flow rates per unit length are almost uniform across the branched legs 42. The uniform flow rates result in uniform cooling of the fuel cell 12 across the fuel cell stack 10. As illustrated in FIG. 6, the temperature increase profile is relatively uniform across the stack.

Referring now to FIG. 4, the branched legs 42 are collapsed into single outlet legs 46 at the uniting junctions 44. It is anticipated that the number of outlet legs 46 corresponds to the number of inlet legs 38. However, it is appreciated that the number of outlet legs 46 can differ from the number of inlet legs 38. In general, the branched legs 42 associated with the medial inlet legs 38 unite into medial outlet legs 46. Similarly, the branched legs 42 associated with the lateral inlet legs 38 unite into corresponding lateral outlet legs 46. The split fluid of a particular set of branched legs 42 is combined at the uniting junctions 44. As a result, the fluid flow rate through a particular outlet leg 46 is increased over the fluid flow rates through the corresponding branched legs 42.

It is also anticipated that the outlet legs 46 have a similar triangular-shaped length profile as the inlet legs 38. More specifically, the lengths of the outlet legs 46 decrease from the medial outlet legs 46 across the lateral outlet legs 46. As a result, there is a greater pressure drop along the medial outlet legs 46 than the lateral outlet legs 46 as similarly described above for the inlet legs.

Although the flow field geometry has been described herein with respect to a coolant flow field, it is anticipated that the flow field geometry can be implemented in other flow field applications. Such applications include, but are not limited to, reactant flow fields such as the anode and cathode flow fields 26,32. Implementation of the flow field geometry of the present invention in a reactant flow field enables uniform distribution of the reactant across the fuel cell stack 10. In this manner, the active area of the fuel cell stack 10 may be more efficiently used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flow field geometry for a fuel cell comprising:
a plurality of straight inlet legs, the plurality of straight inlet legs including at least one medial inlet leg and at least one lateral inlet leg on each side of the medial inlet leg, the inlet legs running from an inlet header to a plurality of dividing junctions, the dividing junctions dividing each of the inlet legs into a set of branched legs, wherein the number of branched legs decreases from at least one medial dividing junction to the most lateral dividing junctions and the length of the inlet legs decreases from the at least one medial inlet lea to the most lateral inlet legs.

2. The flow field geometry of claim 1, wherein the inlet legs are parallel and respective lengths associated therewith define a triangular-shaped length profile with the at least one medial inlet leg defining an apex of the triangle.

3. The flow field geometry of claim 1, wherein the lengths of the lateral branched legs are longer than the lengths of the medial branched legs.

4. The flow field geometry of claim 1, wherein the branched legs of the dividing junctions of the lateral inlet legs run in a lateral direction at the dividing junctions.

5. The flow field geometry of claim 1, wherein the branched legs of the dividing junctions of the most lateral inlet legs consist of three straight portions with each straight portion separated by a turn.

6. The flow field geometry of claim 1, wherein the plurality of straight inlet legs comprises twenty inlet legs.

7. The flow field geometry of claim 1, further comprising a plurality of outlet legs running from an outlet header to a plurality of uniting junctions, the uniting junctions joining the branched legs from the plurality of dividing junctions.

8. The flow field geometry of claim 7, wherein the outlet legs are parallel and respective lengths associated therewith define a triangular-shaped length profile with at least one medial outlet leg defining an apex of the triangle.

9. The flow field geometry of claim 1, wherein:
the plurality of straight inlet legs includes a first leg, a second leg that is shorter than and laterally offset from the first leg, and a third leg that is shorter than and laterally offset from the first leg on a side opposite the second leg; and
the plurality of dividing junctions includes a first junction dividing the first leg into a first set of branched legs, a second junction dividing the second leg into a second set of branched legs, and a third junction dividing the third leg into a third set of branched legs, wherein the number of the first set of branched legs is greater than the number of the second set of branched legs and the number of the third set of branched legs.

10. The flow field geometry of claim 9, wherein the inlet legs are parallel and respective lengths associated therewith define a triangular-shaped length profile with the first leg comprising a medial inlet leg and defining an apex of the triangle.

11. The flow field geometry of claim 9, further comprising:
a plurality of outlet legs including a first outlet leg, a second outlet leg laterally offset from the first outlet leg, and a third outlet leg laterally offset from the first outlet leg on a side opposite the second outlet leg;
a plurality of uniting junctions including a first uniting junction joining the first set of branched legs with the first outlet leg, a second uniting junction joining the second set of branched legs with the second outlet leg, and a third uniting junction joining the third set of branched legs with the third outlet leg; and
an outlet header, wherein the plurality of outlet legs runs from the outlet header to the plurality of uniting junctions.

12. The flow field geometry of claim 11, wherein the outlet legs are parallel and respective lengths associated therewith define a triangular-shaped length profile with the first outlet leg defining the apex of the triangle.

13. A separator plate for use in a fuel cell comprising:
a flow field comprising a plurality of straight inlet legs, the plurality of straight inlet legs including at least one medial inlet leg and at least one lateral inlet leg on each side of the medial inlet leg, the inlet legs running from an inlet header to a plurality of dividing junctions, the dividing junctions dividing each of the inlet legs into a set of branched legs, wherein the number of branched legs decreases from at least one medial dividing junction to the most lateral dividing junctions and the length of the inlet legs decreases from the at least one medial inlet leg to the most lateral inlet legs.

14. The separator plate of claim 13, further comprising a coolant flow through the plurality of straight inlet legs.

15. The separator plate of claim 14, wherein the coolant flow rate at the end of the most lateral inlet legs is greater than the coolant flow rate at the end of the medial inlet legs.

16. The separator plate of claim 14, wherein the coolant flow rate at the branched legs of the medial dividing junctions is lower than the coolant flow rate at the branched legs of the lateral dividing junctions.

17. The separator plate of claim 14, wherein coolant flow is metered to provide an equivalent coolant flow per unit length.

18. A fuel cell comprising:

a membrane electrode assembly; and a separator plate including a flow field comprising a plurality of straight inlet legs, the plurality of straight inlet legs including at least one medial inlet leg and at least one lateral inlet leg on each side of the medial inlet leg, the inlet legs running from an inlet header to a plurality of dividing junctions, the dividing junctions dividing each of the inlet legs into a set of branched legs, wherein the number of branched legs decreases from at least one medial dividing junction to the most lateral dividing junctions and the length of the inlet legs decreases from the at least one medial inlet leg to the most lateral inlet legs.

19. The fuel cell of claim 18, further comprising coolant flowing through the plurality of straight inlet legs.

20. The fuel cell of claim 19, wherein the coolant flow provides uniform cooling of the fuel cell.

* * * * *